United States Patent [19]

Onuki et al.

[11] Patent Number: 5,798,833
[45] Date of Patent: Aug. 25, 1998

[54] ROTATION SPEED MEASURING MACHINE FOR FLYING GLOBE

[75] Inventors: Masahide Onuki, Miki; Satoru Kinuhata, Kobe; Yuichi Takeuchi, Toyota; Yoshiaki Miyamoto, Kobe; Tetsuo Yamaguchi, Nishinomiya, all of Japan

[73] Assignee: Sumitomo Rubber Industries, Ltd., Kobe, Japan

[21] Appl. No.: 665,691

[22] Filed: Jun. 18, 1996

[30] Foreign Application Priority Data

Jun. 19, 1995 [JP] Japan ................................ 7-175501

[51] Int. Cl.$^6$ ................................................ A63B 57/00
[52] U.S. Cl. ................................ 356/256; 473/199
[58] Field of Search .......................... 356/256; 473/198, 473/199, 200

[56] References Cited

U.S. PATENT DOCUMENTS 3,630,601 12/1971 Lehovec ................................ 250/256
5,471,383 11/1995 Gobush et al. ........................ 364/410
5,481,355 1/1996 Iijima et al. ........................... 356/28

FOREIGN PATENT DOCUMENTS 55-146046  1/1981  Japan.

Primary Examiner—Richard A. Rosenberger
Attorney, Agent, or Firm—Kanesaka & Takeuchi

[57] ABSTRACT

A rotation speed measuring machine for a flying globe is formed of a light projecting device 10 projecting light on a measurement conducting area A which is a space including an expected flying route of a flying globe B after the globe has been hit at a hitting position, a light receiving device 20 which receives reflection light from the flying globe flying in the measurement conducting area A and which outputs a signal according to the fluctuation of the amount of reflected light, and a rotational speed detecting means 30 detecting the rotational speed of the flying globe B based on the output signal from the light receiving device 20 in order to measure the rotational speed of the flying globe B by putting a mark M having a light reflectance rate different from the reflectance rate of the surface texture on a part of the surface of the flying globe B and by detecting the amount of reflected light from the mark. The amount of spin of the flying globe B is measured at around the highest point of the flight locus.

8 Claims, 5 Drawing Sheets

F I G. 3

| TEST No. | LIGHT SOURCE | DISTANCE (m) | POSITION | INTENSITY OF ILLUMINATION (Lx) | ROTATIONAL SPEED (rpm) | MEASURED VALUE |
|---|---|---|---|---|---|---|
| 1 | DC | 30 | MID | 70 | 9000 | INCOMPLETE WAVE FORM |
| 2 | THE SAME AS ABOVE | THE SAME AS ABOVE | THE SAME AS ABOVE | 100 | 9000 | 8960 |
| 3 | THE SAME AS ABOVE | THE SAME AS ABOVE | THE SAME AS ABOVE | THE SAME AS ABOVE | 6000 | 6000 |
| 4 | THE SAME AS ABOVE | THE SAME AS ABOVE | THE SAME AS ABOVE | THE SAME AS ABOVE | 2000 | 2000 |
| 5 | THE SAME AS ABOVE | THE SAME AS ABOVE | RIGHT | THE SAME AS ABOVE | 9000 | 8960 |
| 6 | THE SAME AS ABOVE | THE SAME AS ABOVE | THE SAME AS ABOVE | THE SAME AS ABOVE | 6000 | 6000 |
| 7 | THE SAME AS ABOVE | THE SAME AS ABOVE | THE SAME AS ABOVE | THE SAME AS ABOVE | 2000 | 2000 |
| 8 | THE SAME AS ABOVE | THE SAME AS ABOVE | LEFT | THE SAME AS ABOVE | 2000 | 2000 |
| 9 | THE SAME AS ABOVE | THE SAME AS ABOVE | THE SAME AS ABOVE | THE SAME AS ABOVE | 6000 | 6000 |
| 10 | THE SAME AS ABOVE | THE SAME AS ABOVE | THE SAME AS ABOVE | THE SAME AS ABOVE | 9000 | 8960 |

ROTATION SPEED MEASURING MACHINE FOR FLYING GLOBE

BACKGROUND OF THE INVENTION

1. Field of the Invention

The present invention relates to a rotation speed measuring machine for a flying globe such as a golf ball, tennis ball and so on, and more particularly, relates to a rotation speed measuring machine for a flying globe which can measure the rotational speed (spin amount) of a flying globe which has been hit and is flying in the air.

2. Description of Related Art

The measurement of the rotational speed of a rotating object without touching it is generally conducted in such a way that a specified light reflection mark is put on the rotating object and the amount of movement of the light reflection mark within a specified time is optically read.

As for a golf ball the same principle holds. For example, in Japanese Patent Application Publication No. Shou 60-21349 Official Gazette, reflection marks are put on two parts of the surface of a golf ball so that the two parts marked have a specified angle θ to the center while a light projecting device and a light receiving device are positioned so as to face the surface on which the golf ball is passing when the ball is hit and flies, and from the time interval t between two electronic signals obtained from the two above-described reflection marks by receiving the reflected light, which comes from the light projecting device, hits the reflection mark and is reflecting, in the light receiving device, the spin amount S of the golf ball is obtained using the formula S=60×θ/t×360 rpm (the prior embodiment 1).

As for a method similar to this prior embodiment 1, there are Japanese Patent Application Publication No. Shou 60-22302 (the prior embodiment 2), Japanese Patent Application Publication No. Shou 60-22303 (the prior embodiment 3) and so on.

Though the principle is the same as above, it is known that the measurement of the rotational speed of a flying globe is conducted by photographing or using a video camera. That is, a plurality of pictures of a flying globe are taken at specified time intervals, and from the amount of movement of the mark put on a specified position on the flying globe, the rotational speed can be obtained (the prior embodiment 4).

In the case of the prior embodiment 1 to the prior embodiment 3, however, both the light projecting surface of the light projecting device and the light receiving surface of the light receiving device consist of bundles of optical fibers, and the light projected area and the amount of projected light are limited, so that the effective detected range is no more than 500 mm long, 15 mm broad, and tens of centimeters high.

Accordingly the rotational speed of a ball immediately after a shot with comparatively less blurring and at a lower position can be measured, but the rotational speed of a ball after this which has been driven high with its route unsettled can't be measured.

When stationary pictures are obtained by photographing or using a video camera as in the prior embodiment 4, if a ball rotates at a high speed, or a ball moves at a high speed, clear picture may not be obtained, so that a flashing device with a short flash time such as a high speed shutter or a micro flash is additionally needed; therefore there is a disadvantage that the entire machine becomes complicated.

It is known that there is a method of taking a stationary picture in a computer by a picture input device and reading the movement amount on the monitor by setting a cursor, and a method of performing a two value process of a picture and making a computer recognize a mark of a specified position on a globe in order to automatically conduct a measurement, but either method has the disadvantages of a complicated program and a lot of time needed for processing data.

In order to increase the precision of measurement of the amount of movement, it is necessary to take a large picture of a ball, but if doing so, the measurement conducting area is reduced, so that the rotation of the ball which has been driven high and is flying in the air, for example, near the highest point is difficult to be measured as in the above.

The amount of spin of a tennis ball in a tennis game is more difficult to be measured since the locus of the ball is further unsettled than that of a golf ball.

Mitigating these conventional circumstances, an object of the present invention is to provide a comparatively simply arranged rotation speed measuring machine for a flying globe which can measure the rotational speed of for example, a flying globe driven high, with a specified range of space in a field as its measurement conducting area.

SUMMARY OF THE INVENTION

In order to attain the above-described object, the present invention is a rotation speed to measure machine for a flying globe measuring the rotational speed of a flying globe by putting a mark having a light reflection rate different from the surface texture on a part of the surface of the flying globe and by detecting the amount of reflected light, and is provided with a light projecting device projecting light on a measurement conducting area which is a space including an expected flying route of the above-described flying globe after the globe has been hit from the ball hitting position, a light receiving device which receives the reflected light from the above-described flying globe flying in the above-described measurement conducting area and which outputs a signal according to the fluctuation of the amount of reflected light, and a rotation speed detecting means detecting the rotational speed of the above-described flying globe based on the output signal from the light receiving device.

In this case a photo diode, phototransistor, or a photoelectric tube are used for the above-described light receiving device as a light sensor, but when the measurement conducting area is darkened or the measurement is conducted at night, it is preferable that a photomultiplier with extremely high reception is used. It is preferable that the above-described light projecting device is a DC light without light amount fluctuation in itself.

Further it is preferable that the above-described measurement conducting area is equal to or larger than the range in which the above-described flying globe rotates at least twice as it is moving and that the intensity of illumination is at least 100 Lx.

As for the case when the rotational speed of a golf ball is measured, it is preferable that an arbitrary area of 5 m, which is within 5 to 50 m ahead of the light projecting device and which is at the same time within a cylindrical area with a diameter of about 3.6 m having the optical axis of the light projecting device as its center, has intensity of illumination of at least 100 Lx.

It is said that a golf ball normally flies at a speed of 40 to 60 m/s with 2000 to 9000 rpm of spin and that the amount of spin is at least about 2000 rpm when the golf ball flies at the highest speed of 60 m/s.

Meanwhile, when the rotational speed is measured with a light reflection tape on a golf ball, at least one period of fluctuation of the amount of reflected light is required for the measurement.

In order to obtain one period of fluctuation of the amount of reflected light of a golf ball, a golf ball should make one rotation regardless of the shape of a light reflection tape.

From the above, the distance in which the golf ball, which flies under the conditions where the largest measuring area is needed, that is, at the highest speed (60 m/s) with the smallest amount of spin (2000 rpm), flies while the ball rotates once is 1.8 m from the following equation.

$$60 \text{ m/s} \times (1 \times 60/2000)\text{s} = 1.8 \text{ m}$$

Accordingly, the projection range of the light projecting device should have the distance of at least 1.8 m.

When one peak of the light fluctuation is obtained, for example, near the center of the measuring area, it is better if the measuring area is larger in order to measure another peak.

If the measuring, area is about twice as large as the distance in which a ball moves when the ball makes one rotation, at least two periods of fluctuation of the amount of reflected light can be obtained, and therefore the amount of spin of the ball can be measured with high precision even if the peak of the fluctuation of the amount of light is obtained at an arbitrary position of the measuring area.

Accordingly if the projection range of the light projecting device has a radius of about 1.8 m, that is, a diameter of about 3.6 m based on the following equation, the amount of spin of a ball driven by an arbitrary ordinary club can be surely measured.

$$60 \text{ m/s} \times (2 \times 60/2000)\text{s} = 3.6 \text{ m}$$

For example, the light projecting device is positioned at the lower part of a flying area in which a flying globe (for example, a golf ball) is expected to come flying and light is projected from the light projecting device towards the upper space, that is, the sky. In this case, the brightness of the background (in the case of an outdoor area, the sky) does not change at least abruptly by second or by minute, and is comparatively stable; therefore when a golf ball does not come flying, the detected signal outputted from the light receiving device is stable at a level which can be regarded as almost constant whether the level is high or low.

In this state, when the golf ball with the above-described mark on it comes flying, the amount of received light (received light level) of the light receiving device changes according to the rotational speed. The change in this case is at an incomparably high speed and large compared to the change of the background, so that the rotational speed of the golf ball is obtained by extracting the amount of change.

In short, even if the background has light fluctuation, the rotational speed of the golf ball can be measured unless the period of the amount of light fluctuation of the background and the period of the amount of light fluctuation when the golf ball comes flying are the same.

Accordingly, it is suitable if a DC light which does not include fluctuation in the amount of light is used for the light projecting device.

BRIEF DESCRIPTION OF THE DRAWINGS

FIG. 3 is a table showing the measurement results of test 1 to test 10;

DETAILED DESCRIPTION OF THE PREFERRED EMBODIMENT(S)

The advantages of the present invention will be more clearly understood by reading each embodiment described below with reference to the attached drawings.

Figure 1:
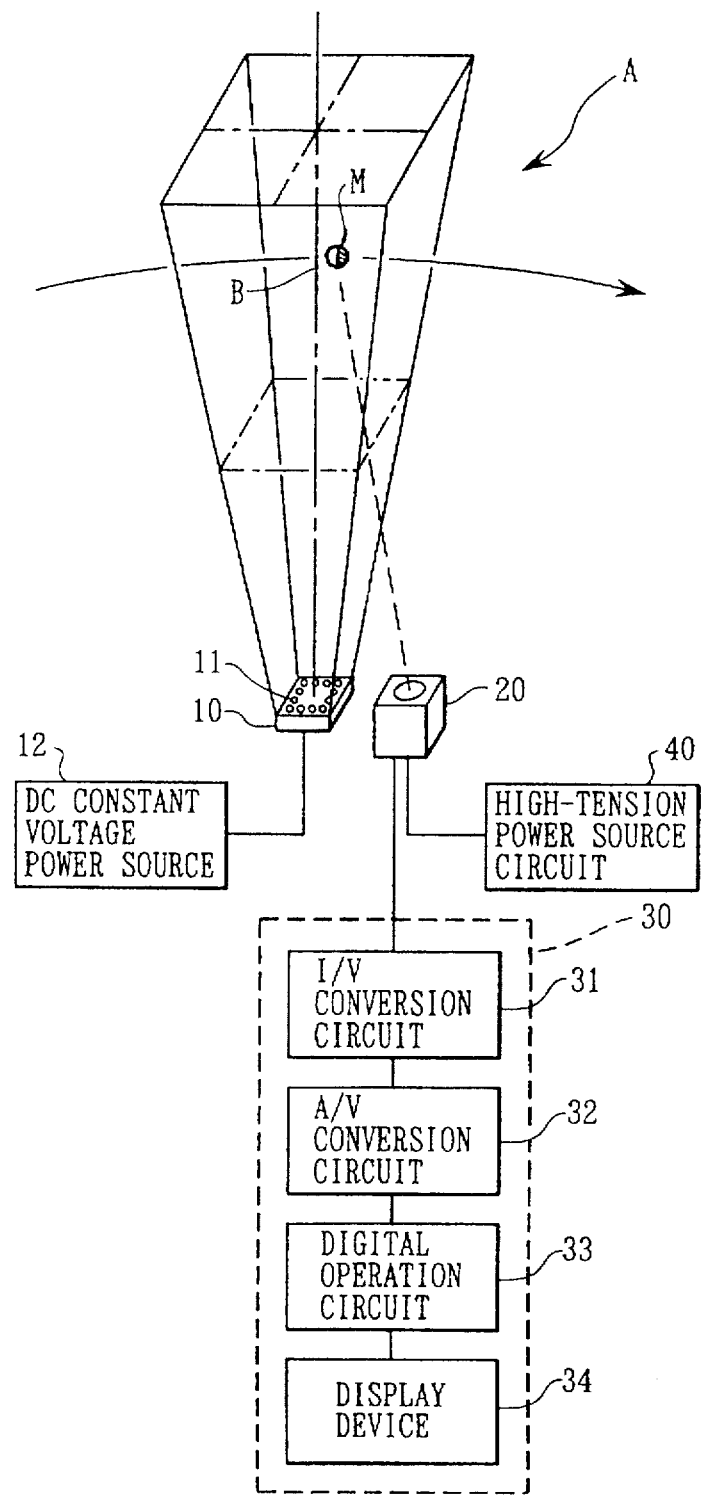
FIG. 1 is a typical view for explaining one embodiment of the rotation speed measuring machine of the present invention.

A preferable embodiment will be described below with reference to the drawings. FIG. 1 depicts a typical view of the state in which the rotational speed (spin amount) of a flying golf ball B is measured by using the measuring machine of the present invention. In this case, a mark M having a light reflectance rate different from that of the surface texture of the golf ball B should be put on a part of the surface of the golf ball B, and in this embodiment, the mark M consisting of, for example, black painting is put on so as to cover half the surface of the golf ball B, that is the surface of its hemisphere.

This measuring machine is provided with a light projecting device 10 which projects light onto a measurement conducting area A which is a space including an expected flying route of the golf ball which has been hit from the hitting position from, for example, the direction right beneath the measurement conducting area A, a light receiving device 20, for example, with its optic axis facing the vertical direction, in order to receive the diffusing light reflected from the golf ball B flying in the measurement conducting area A, a rotational speed detecting means 30 detecting the rotational speed of the golf ball B based on the output signal outputted from the light receiving device 20 according to the amount of light received, a DC constant voltage power source 12 supplying the light projecting device 10 with electric power, and a high-tension power source circuit 40 supplying the light receiving device 20 with electric power.

In this embodiment, DC light having no fluctuation in the amount of light is used for the light projecting device 10 in order that the fluctuation in the amount of light of the projecting device itself does not interfere with the measurement of the fluctuation in the amount of light resulting from the rotation of the golf ball B. In concrete, the light projecting device 10 consists of sixteen automobile halogen lamps 11 of 85 W and the variable DC constant voltage power source 12 of DC 0 to 12V. The direction of each optical axis of each halogen lamp 11 is set and positioned so that the measurement conducting area A has an almost even intensity of illumination.

Meanwhile, the light receiving device 20 consists of a condensing lens having, for example, a diameter of 100 mm and a focal distance of 75 mm, and a photomultiplier. As for the photomultiplier, for example, R2228 (Trademark) made by Hamamatsu Photonics Co., Ltd. and so on are cited.

The reason why a photomultiplier is used here is that a higher S/N ratio can be obtained by a photomultiplier compared to the case in which a signal amplification is conducted by an amplifier by using a photo diode, phototransistor, a photo-electric tube and so on when the measurement is conducted at night for the purpose of receiving greater fluctuation in the amount of reflected light from the golf ball B than in the amount of light existing in the background.

The rotation speed detecting means 30 is provided with an electric current-voltage conversion circuit 31 converting the output current outputted from the photomultiplier of the light receiving device 20 according to the fluctuation in the amount of light into a voltage signal, an A/D conversion circuit 32 converting the analogue voltage signal into a digital signal, a digital operation circuit 33 which calculates the voltage fluctuation period T (sec) using the digital signal and which obtains the spin amount S of the golf ball B by conducting the operation of 60(sec)/T (sec) using the data of this period T, and a display device 34 showing the spin amount S. The voltage fluctuation period T is obtained by the operation recognizing the maximum value of the voltage fluctuation and the operation calculating the time between the maximum values.

In this embodiment, a personal computer is used for the A/D conversion circuit 32, the digital operation circuit 33 and the display 34, and the wave form of the voltage fluctuation is shown on CRT and can be observed. The period T is obtained from the time between the maximum values of the fluctuation signal on the assumption that the fluctuation of the amount of light existing in the background is small in this embodiment, however, when the amount of light existing in the background fluctuates greatly, unnecessary fluctuation constituent may be eliminated by providing a filter circuit.

Further, the fluctuation period of the amount of the reflected light of the golf ball B may be obtained from the frequency constituent by suitably designing the light projecting device 10 so that a sufficient length of wave form of the desired fluctuation of the amount of light can be obtained and by conducting Fast Fourier Transform (FFT) of the signal.

In the above-described embodiment, the mark M consisting of black paint is put on the surface of the hemisphere, however, the method of partially changing the reflectance rate is not limited to that in this embodiment. For example, the painting classification part may be divided into quarters, that is the surface of the golf ball B may be divided into quarter segments and the light reflection mark M may be put on the surfaces of two divided quarter segments facing each other, and the color of the mark is not limited to black.

In short, any method may be suitable if the amount of reflected light changes according to the rotation of the golf ball B, and the method is not particularly limited if only the rotational speed of the ball can be obtained from the change of the amount of reflected light. When the surface is divided into quarter segments for marking, the fluctuation period of the amount of light for the rotational speed of the ball becomes ½ of that in the case when the surface is divided into halves, so that when the fluctuation of the amount of light exists in the background or in the projected light itself, the separation may be easier by making the fluctuation period of the amount of light in the background or in the projected light different from the fluctuation period of the amount of reflected light from the rotation of the ball.

In the above-described embodiment, the light projecting device 10 and the light receiving device 20 are positioned right beneath the measurement conducting area A in order to particularly measure the back spin of the golf ball B. However, the direction of each optical axis of the light projecting device 10 and the light receiving device 20 is not limited to this position and can be suitably set in consideration of the direction of the rotation axis of the spin to be measured and the reflected light from the background of the place for conducting measurement.

Figure 2A:
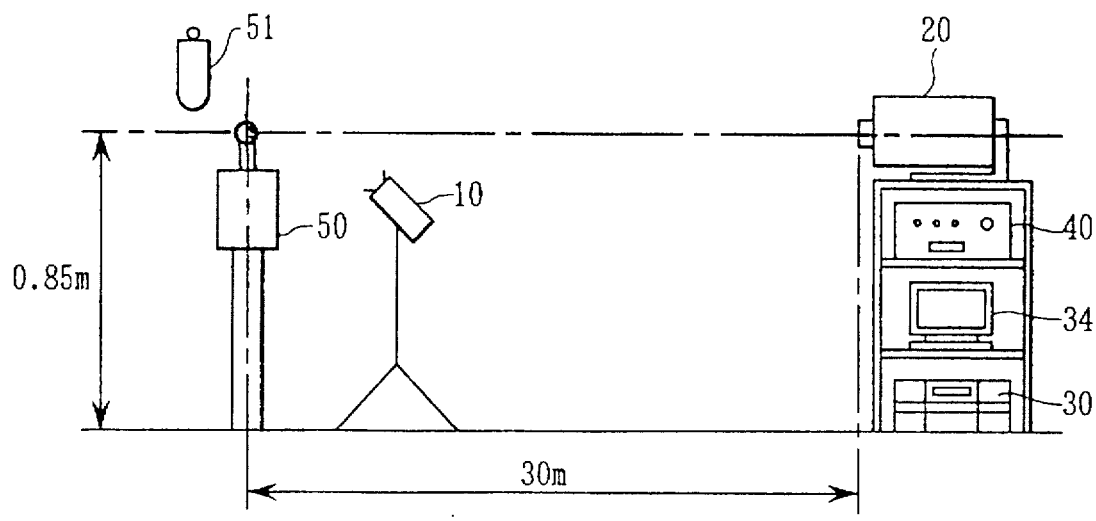
FIG. 2(A) and FIG. 2(B) are a side view and a plan view typically showing the state of the test in which a golf ball is rotated by a motor and the rotational speed is measured by the rotation speed measuring machine of the present invention.
Figure 2B:
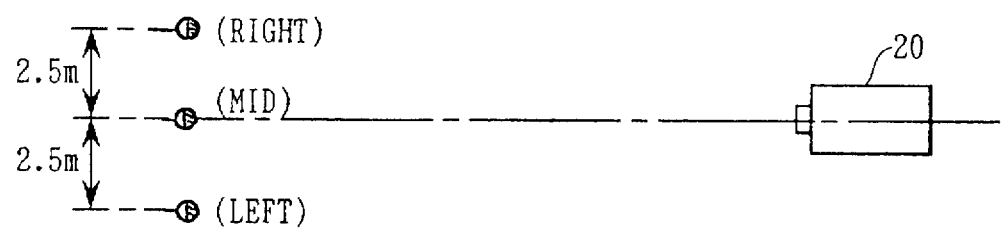

The measurement of the spin amount (rotation speed) by using this rotation speed measuring machine was conducted by creating the simulated state in which the above-described golf ball B is rotating in the air, and the description of the measurement with reference to FIG. 2(A) and FIG. 2(B) will be as follows. FIG. 2(A) is a typical side view of the scene of the test and FIG. 2(B) is a typical plan view of the scene of the test.

First, the golf ball B with its half of the surface painted black as described above is attached on the rotation shaft of a variable motor 50 and set at the position 850 mm above the ground while the light receiving device 20 is set at a position 30 m apart from the golf ball B in such a way that the optical axis of received light passes the center of the rotation of the golf ball B and is horizontal at the same time.

Since in this test the optical axis of the received light of the light receiving device 20 is in the horizontal direction as described above, there is a fear of light reflecting from the ground coming out as noises when the light projecting device 10 is positioned near the light receiving device 20, so that a dry cell type of a penlight is used for the light source and the light is projected on the golf ball B from the lower position at an angle.

This test is conducted at night in order to obtain a greater amount of fluctuation of the light from the golf ball B than the amount of light existing in the background and the intensity of illumination near the golf ball B is measured with an illuminometer 51. The measurements were conducted by setting the golf ball B at the mid position which is on the optical axis of the received light of the light receiving device 20, and at the right position and the left position which are respectively and laterally 2.5 m away from the same optical axis of the received light as FIG. 2(B) depicts, assuming an actual case when the golf ball B rotates as it is flying in the measurement conducting area. The rotational speed of the golf ball B by the motor 10 is respectively 2000 rpm, 6000 rpm, and 9000 rpm at each position.

(Test 1)

The golf ball B was rotated by the motor 50 at 9000 rpm at the mid position on the optical axis of the received light of the light receiving device 20 with 70 Lx of intensity of illumination of the area surrounding the golf ball B. After the amount of reflected light was detected at the light receiving device 20 and the output signal was taken in the rotation speed detecting means 30, the fluctuation period was to be read by observing the wave forms, but the fluctuation period could not be measured since the wave forms were incomplete.

(Test 2)

When intensity of illumination of the area surrounding the golf ball B was changed to be 100 Lx with other things being under the same conditions as in Test 1 and the measurement was conducted, the wave form of 0.0067 sec period was observed. Accordingly, the measured value in this case was 8960 rpm which was a little lower than the actual rotational speed.

(Test 3)

When the golf ball B was rotated by the motor 50 at 6000 rpm with 100 Lx of intensity of illumination of the area surrounding the golf ball B and with the other things being under the same conditions as in Test 1, the wave form of 0.010 sec period was observed and by this 6000 rpm which was the same as the actual rotational speed was measured.

(Test 4)

When the golf ball B was rotated by the motor 50 at 2000 rpm with 100 Lx of intensity of illumination of the area surrounding the golf ball B and with the other things being under the same conditions as in Test 1, the wave form of 0.030 sec period was observed. By this, 2000 rpm which was the same as the actual rotational speed was measured.

(Test 5)

The golf ball B was rotated by the motor 50 at 9000 rpm at the (right) position 2.5 m away in the right direction from the optical axis of the received light of the light receiving device 20 with 100 Lx intensity of the illumination of the surrounding area. When the amount of reflected light was detected at the light receiving device 20 and the output signal was taken in the rotation speed detecting means 30 to observe the wave form, the wave form of 0.0067 sec period was observed. Accordingly, the measured value of this case was 8960 rpm which was a little lower than the actual rotational speed.

(Test 6)

When the golf ball B was rotated by the motor 50 at 6000 rpm with the other things being under the same conditions as in Test 5, the wave form of 0.010 sec period was observed and by this 6000 rpm which was the same as the actual rotational speed was measured.

(Test 7)

The golf ball B was rotated by the motor 50 at 2000 rpm with the other things being under the same conditions as in Test 5, the wave form of 0.030 sec period was observed and by this 2000 rpm which was the same as the actual rotational speed was measured.

(Test 8)

The golf ball B was rotated by the motor 50 at 2000 rpm at the left position 2.5 m away in the left direction from the optical axis of the received light of the light receiving device 20 with 100 Lx of intensity of illumination of the surrounding area. When the amount of reflected light was detected at the light receiving device 20 and the output signal was taken in the rotation speed detecting means 30 to observe the wave form, the wave form of 0.030 sec period was observed and by this 2000 rpm which was the same as the actual rotational speed was measured.

(Test 9)

When the golf ball B was rotated by the motor 50 at 6000 rpm with the other things being under the same conditions as in Test 8, the wave form of 0.010 sec period was observed and by this 6000 rpm which was the same as the actual rotational speed was measured.

(Test 10)

When the golf ball B was rotated by the motor 50 at 9000 rpm with other things being under the same conditions, the wave form of 0.0067 sec period was observed. Accordingly, the measured value of this case was 8960 rpm which was a little lower than the actual rotational speed.

The results of these tests show that when the intensity of illumination of the area around the ball (flying globe) is at least 100 Lx the output signal can be steadily obtained from the light receiving device according to the spin amount (rotational speed) even if the ball was away from the optical axis of the received light of the light receiving device. For reference, the measurement results of the above-described Test 1 to 10 are shown in FIG. 3.

Then test 11 in which the golf ball B was actually driven in the air and the amount of spin near the highest point on the flying locus was measured will be described in the following.

(Test 11)

The surfaces of two divided quarter segments of the golf ball were painted black in order that the surfaces of two divided quarter segments facing each other of four divided quarter segments have a light reflection rate different from the light refection rate of the texture surface. Accordingly, when this golf ball makes one rotation, two periods of fluctuation of the amount of light can be obtained.

Then this golf ball was driven into the air by the driver of the golf club attached at the swing robot at a starting speed of about 60 m/s, at a driving angle of about 11 degrees, with starting spin amounting to about 3300 rpm.

Meanwhile, the light projecting device 10 was positioned so that the amount of spin of the golf ball at the position of 140 m ahead of the driving position was able to be measured. The height of the flight of the golf ball at this position was about 30 m.

Two lines of eight automobile halogen lamps placed at intervals of 300 mm were provided parallel to each other (a total of sixteen lamps) as this light projecting device 10, and with the optical axis of each lamp being vertically adjusted, 12V was applied to each lamp by the DC constant-voltage power supply.

Figure 4:
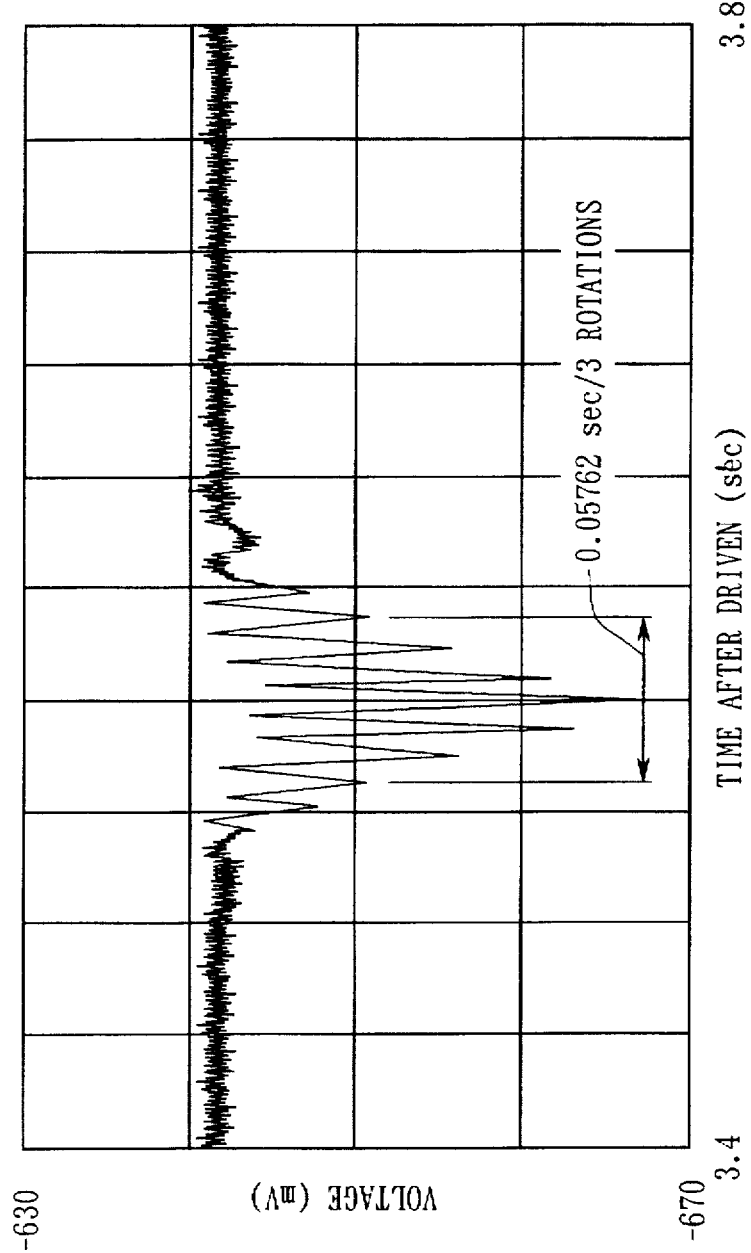
FIG. 4 is a graph showing the fluctuation of the amount of reflected light reflected from the golf ball in test 11.

The amount of light fluctuation of the reflected light reflected from the golf ball is shown in FIG. 4. This drawing shows that it took 0.05762 seconds for the golf ball to rotate three times.

Accordingly, the amount of spin of the golf ball at this time can be approximately computed to be about 3120 rpm from the following equation.

$$60/(0.05762/3) = \text{about } 3120 \text{ rpm}$$

When the golf ball passes the measurement conducting area at a speed of 60 m/s, the distance in which the golf ball moves while the golf ball rotates three times can be approximately computed to be about 3.6 m from the following equation.

$$0.05762 \times 60 = \text{about } 3.6 \text{ m}$$

In other words, if the light projecting device 10 is suitably set so that the distance of the measurement conducting area is at least 3.6 m, the fluctuation in the amount of light of the golf ball after rotating three times can be obtained, so that it can be understood that the amount of spin of the golf ball can be measured with high precision.

In this measuring device, a measurement was able to be conducted even when only eight lamps out of sixteen lamps arranging the light projecting device 10 were lit by lighting every other lamp out of the lamps placed in each line.

In short, in this measuring device, the amount of spin of the golf ball can be measured even by using an arbitrary number of lights out of sixteen lights if the golf ball passes so as to cross the optical axis.

Figure 5:
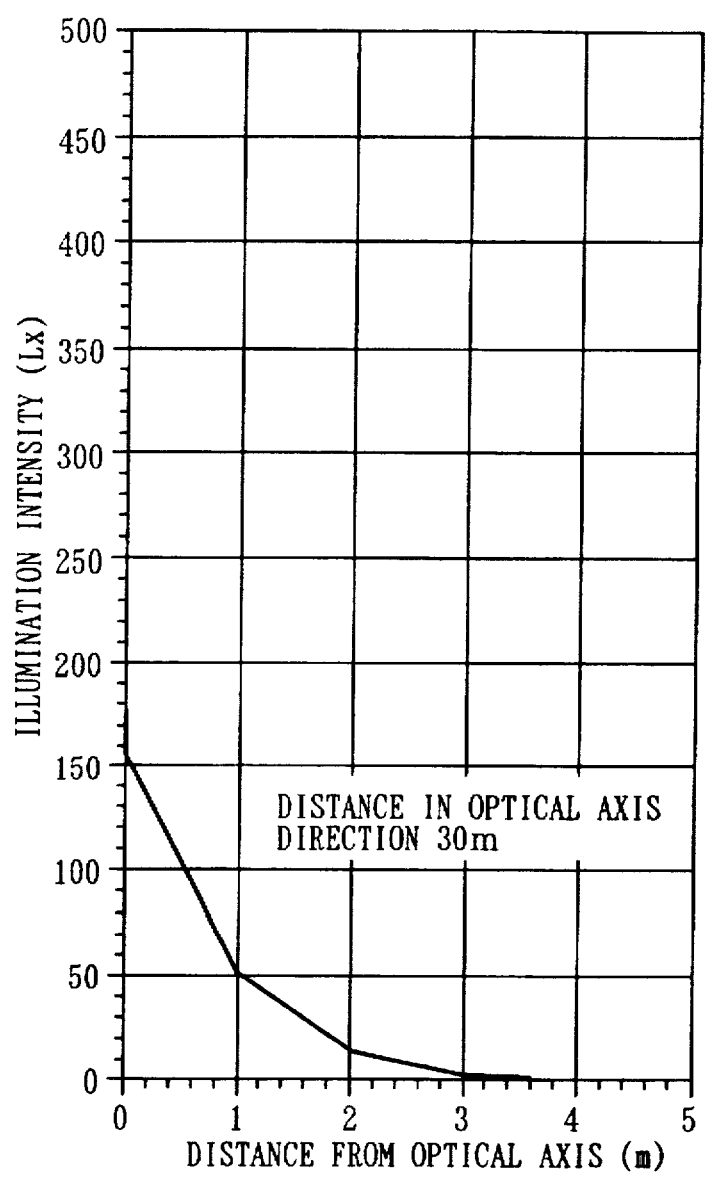
FIG. 5 is a graph showing the result of the examination of illumination intensity distribution of an automobile's 85 W halogen lamp.

For reference, the examination result of the illumination intensity distribution of an automobile's 85 W halogen lamp at the position 30 m ahead of the automobile's 85 W halogen lamp is shown in FIG. 5.

As described above, by the present invention the following effects were obtained. That is, the rotational speed of the ball actually flying in the air at around the highest point of its flight locus can be measured by the invention in claim 1 which is provided with the light projecting device projecting light onto the measurement conducting area of the space including the expected flying route of the flying globe (for example, a golf ball) which has been hit from the ball hitting position, the light receiving device which receives reflected light from the flying globe flying in the measurement conducting area and which outputs a signal according to the degree of fluctuation of the reflected light, and the rotation speed detecting means detecting the rotational speed of the above-described flying globe based on the output signal from the light receiving device.

By the second aspect of the invention in which a photomultiplier is used in the above-described light receiving device, a high S/N ratio can be obtained, so that it is especially suitable for a measurement which is conducted at night.

By the third aspect of the invention in which the above-described light projecting device is a DC light, no light fluctuation from the light projecting device exists, so that the same amount of noise can be reduced.

By the fourth aspect of the invention in which the above-described measurement conducting area is equal to or larger than the range in which the above-described flying globe rotates at least twice as it is moving, the fluctuation frequency caused by the light reflection mark of the flying globe can be obtained with higher precision.

Meanwhile, by the fifth aspect of the invention in which the intensity of illumination of the above-described measurement conducting area is 100 Lx or more, an output signal can be steadily obtained according to the rotational speed of the ball even if the ball is away from the optical axis of the received light of the light receiving device.

Regarding each invention described above, by the sixth aspect of the invention in which an arbitrary area of 5 m, which is within 5 to 50 m ahead of the light projecting device and at the same time within the cylindrical area with a diameter of about 3.6 m having the optical axis of the above-described light projecting device as its center, has 100 Lx of intensity of illumination, at least 2 periods of the light amount fluctuation wave forms can be surely observed, so that the rotational speed of a flying globe can be measured more precisely.

What is claimed is:

1. A rotation speed measuring machine for a flying golf ball with a mark on a surface thereof, said mark having a light reflectance rate different from that on the surface other than the mark, comprising:

a light projecting device for projecting light in a measurement conducting area along an expected flying route of the flying golf ball after the golf ball has been hit from a ball hitting position, said measurement conducting area having a length along a flying direction of the flying golf ball at least equal to a range in which the flying golf ball rotates at least twice during flying;

a light receiving device for receiving a reflection light ejected from the light projecting device and reflected by the flying golf ball flying in the measurement conducting area, said light receiving device outputting a signal according to fluctuation of an amount of the reflection light; and rotation speed detecting means electrically connected to the light receiving device for detecting rotational speed of the flying golf ball based on an output signal from the light receiving device.

2. A rotation speed measuring machine for a flying golf ball according to claim 1, wherein a photomultiplier is used in said light receiving device.

3. A rotation speed measuring machine for a flying golf ball according to claim 1, wherein said light projecting device is provided with a DC light.

4. A rotation speed measuring machine for a flying golf ball according to claim 1, wherein the intensity of illumination of the above-described measurement conducting area is at least 100 Lx.

5. A rotation speed measuring machine for a flying golf ball according to claim 1, wherein the length along the flying direction of the flying golf ball is at least 3.6 m.

6. A rotation speed measuring machine for a flying golf ball according to claim 1, wherein the measurement conducting area is 5 to 50 m ahead of the light projecting device and has intensity of illumination of at least 100 Lx.

7. A rotation speed measuring machine for a flying golf ball according to claim 6, wherein said light projecting device is a DC constant voltage power source projecting light in a direction to cross the flying direction for at least 3.6 m.

8. A rotation speed measuring machine for a flying golf ball according to claim 7, wherein said light receiving device includes a condensing lens and a photomultiplier.

* * * * *